(12) United States Patent
DeMayo et al.

(10) Patent No.: US 7,617,121 B1
(45) Date of Patent: Nov. 10, 2009

(54) APPARATUS AND METHOD FOR HYPERLINKING SPECIFIC WORDS IN CONTENT TO TURN THE WORDS INTO ADVERTISEMENTS

(75) Inventors: John DeMayo, Baltimore, MD (US); Robert Aguilar, Vernon (CA)

(73) Assignee: Platform-A Inc., Baltimore, MD (US)

( * ) Notice: Subject to any disclaimer, the term of this patent is extended or adjusted under 35 U.S.C. 154(b) by 1207 days.

(21) Appl. No.: 09/711,261

(22) Filed: Nov. 10, 2000

(51) Int. Cl.
*G06Q 30/00* (2006.01)
(52) U.S. Cl. ........................................ 705/14
(58) Field of Classification Search ............ 705/14
See application file for complete search history.

(56) References Cited

U.S. PATENT DOCUMENTS

| | | | | |
|---|---|---|---|---|
| 5,774,666 | A * | 6/1998 | Portuesi ................... | 725/110 |
| 5,995,943 | A * | 11/1999 | Bull et al. ................ | 705/14 |
| 6,009,410 | A * | 12/1999 | LeMole et al. ........... | 705/14 |
| 6,061,659 | A * | 5/2000 | Murray .................... | 705/14 |
| 6,092,074 | A * | 7/2000 | Rodkin et al. ............ | 707/102 |
| 6,189,030 | B1 * | 2/2001 | Kirsch et al. ............. | 709/224 |
| 6,381,597 | B1 | 4/2002 | Lin | |
| 6,687,734 | B1 | 2/2004 | Sellink et al. | |
| 7,284,008 | B2 * | 10/2007 | Henkin et al. ............ | 707/102 |
| 7,373,313 | B1 | 5/2008 | Kahle et al. | |
| 2002/0107735 | A1 | 8/2002 | Henkin et al. | |
| 2002/0120505 | A1 | 8/2002 | Henkin et al. | |

OTHER PUBLICATIONS

Definition of "hyperlink", Microsoft Press Computer Dictionary, 3rd Ed. (Redmond, WA: Microsoft Press, 1997).*
Definition of "anchor", Microsoft Press Computer Dictionary, 3rd Ed. (Redmond, WA: Microsoft Press, 1997).*
NYTimes reference search for "word", downloaded Feb. 9, 2009 from http://query.nytimes.com/search/query?query=word&srchst=ref&submit.x=21&submit.y=9.*
Festa, Paul, "Few Net Surfers use RealNames' keyword service", CNET News, May 17, 2000, downloaded Jun. 20, 2009.*
Microsoft press release, "MSN Announces Agreement to Incorporate RealNames", Jun. 28, 1999, downloaded Jun. 20, 2009.*

(Continued)

*Primary Examiner*—Donald L Champagne
(74) *Attorney, Agent, or Firm*—Finnegan, Henderson, Farabow, Garrett & Dunner LLP (57) ABSTRACT

The present invention is a method for taking content in text, HTML, or related format from Web pages or documents and searching it for words or phrases that advertisers have contracted to have hyperlinked to their Web pages or documents. These words and phrases are then hyperlinked in HTML format to the advertiser's Web site, in a preferred embodiment involving routing through a tracking URL to track the number of times the hyperlink is clicked on. In a browser-based embodiment, the content is then published on the Internet and readers seeing the content have the option of clicking on the hyperlink and visiting the contracted advertiser's Web site. The hyperlinking of words can be implemented by (i) an ad server overwriting existing content HTML files, (ii) a script overwriting existing files, (iii) coding in existing HTML files referencing the ad server to determine hyperlinked words, or (iv) redirecting users to an ad server page with appropriately altered HTML files.

25 Claims, 8 Drawing Sheets

OTHER PUBLICATIONS

Johnson, Bradley, "HP taps RealNames", Advertising Age, Jul. 17, 2000, vol. 71, p. 48, 2 pgs.*
"RealNames", Wikipedia article, downloaded Jun. 20, 2009.*
Mossberg, Walter S., "Dangerous Detours: Windows XP may add its links to others' sites", Wall Street Journal (Eastern Edition), Jun. 7, 2001, p. B.1.*
Kabanga Spiegel demo, 2 pages http://www.kabanga.com/demo/spiegel, 2000.
Ezula.com., 8 pages http://www.ezula.com./solutions/Default.asp, 2000.
NBCi.com "Quickclick" links, 7 pages http://www.quickclick.com.
Vibrant Media, IntelliTXT$^{SM}$, www.vibrantmedia.com/content/intellitxt_product_page/main.htm, printed Oct. 20, 2003 (1 page).
Vibrant Media, SmartAD$^{SM}$, www.vibrantmedia.com/content/smartad_product_page/main.htm, printed Oct. 20, 2003 (1 page).
Hopper, Ian, "Desktops now have power to comparison shop," CNN.com, Oct. 18, 1999 (3 pages).
Maney, Kevin, "Auctions change the way we shop," refreq.com, Nov. 17, 1999 (3 pages).
"Make mySimon work harder for you!" mySimon.com, 1999 (1 page).
"Using Flyswat," mySimon.com, 1999 (4 pages).
Spring, Tom, "Updated Flyswat Search Has Better Aim," PC World, Feb. 15, 2000 (3 pages).
Festa, Paul, "Amazon pops consumer reviews with zBubbles," cnet.com, Nov. 17, 1999 (3 pages).
Gilmore, Dan, "Subversive Software At Your Service," San Jose Mercury News, Oct. 17, 1999 (3 pages).
"Your Gateway to Online Shopping," RUsure.com; 2000 (1 page).
"Frequently Asked Questions," RUsure.com (2 pages).
"Shopping Bar Information," RUsure.com (3 pages).
O'Brien, Jim, "Don't Check Out Without Them: Desktop shopping agents find . . . " Computer Shopper, Mar. 2000 (3 pages).
Gingerich, Jason, "Keycorp Making Site into Portal," South Bend Tribune, Oct. 25, 1999 (2 pages).
Peet, John, "Survey of E-commerce: In the great web bazaar: everything has its price. The web can help you find out what it is," Economist, Feb. 26, 2000 (4 pages).
Burst! Media article, printed Mar. 30, 2004, http://www.geekvillage.com/forums/showthread.
php?s=1b25a012367c39122680eaeff511f454
&postid=135657#post135657.

* cited by examiner

Hyperlinked document

All four live in the southern port city of Aden, where the two suspected suicide bombers blew up a small boat filled with explosives alongside the Cole as it was refueling on Oct. 12.

The investigation also has revealed that officials in Lahej, a stronghold of the militant Islamic Jihad, provided the suspected bombers with government cars for use in Aden and between Aden and Lahej, 22 miles to the north.

The sources said the suspected bombers knew the officials from their time together fighting the Soviets in Afghanistan in the 1980s.

The officials are believed to belong to a group of Islamic militants formed by veterans of the Afghan war. They are believed to have met several times with the suspected bombers since March, when preparations for the bombing are thought to have started.

According to the sources, the two men took their boat for a test ride in the harbor where the Cole was to dock one month before the bombing. One of the fishermen who helped them take the boat into the water is believed to have been an accomplice, the sources said.

U.S. authorities are pressing Yemeni investigators leading the probe to allow U.S. agents a greater role in the investigation.

A Yemeni official, speaking on condition of anonymity, said that expanding the U.S. role in the investigation is being discussed, but that his country's stand remains that the FBI cannot interrogate Yemeni citizens.

There has been no claim of responsibility considered credible in the strike on the Cole. American officials have said Osama bin Laden—America's No. 1 terror suspect, who has pledged to drive the U.S. military out of the Middle East—is a focus of the investigation. The Saudi millionaire, who is living in Afghanistan, is accused of masterminding the 1998 bombings of U.S. embassies in Kenya and Tanzania.

The Cole is being brought home from Yemen aboard a giant Norwegian transport ship on a long route that avoids the Suez Canal. The Cole was expected to arrive in its home port of Norfolk, by about Dec. 10, said Frederik Steenbuch, manager of Oslo-based Offshore Heavy Transport.

APPARATUS AND METHOD FOR HYPERLINKING SPECIFIC WORDS IN CONTENT TO TURN THE WORDS INTO ADVERTISEMENTS

FIELD OF THE INVENTION

The present invention relates generally to advertising on a network. More specifically, the present invention is a system and method for enabling a party with content or dialogue text or HTML to hyperlink certain words or phrases to advertisers, in exchange for compensation for this advertising service, in real-time, as published, or on a periodically refreshed basis.

BACKGROUND INFORMATION

The hyperlink or hypertext link is what makes the World Wide Web a web. A hypertext, "link" is a selectable connection from one word, picture, or information object to another. The most common form of link is the highlighted word or picture that can be selected by the user (with a mouse or in some other fashion), resulting in the immediate delivery and view of another file. The highlighted object is referred to as an anchor. The anchor reference and the object referred to constitute a hyperlink or hypertext link.

For online advertising, the anchor reference is typically a picture that forms what is called a "banner ad." Content is typically displayed centrally on a web page and ads are displayed peripherally, such as at the top, bottom or side of a web page. As such, ads and content are physically separate. The online advertising industry is finding that, in many cases, it is very effective to integrate advertising closely with content, typically matching the banner ad fields with the content topic, such as advertising bicycles on a web page with content relating to bicycling.

However, present online advertising is suffering from various drawbacks. Many consumers are using free, ad-supported Internet services that display a persistent banner ad window in a location of the service provider's choice, often obscuring, and therefore defeating, the advertising being delivered by the web site being viewed. Other consumers, who are annoyed by banner ads, are increasingly using browsers that incorporate banner-filtering software to prevent ad displays. Additionally, as more consumers access the World Wide Web using devices with smaller displays, such as laptop computers, Internet appliances, palm-size computers, and wireless phones, the graphical links of banner ads are becoming more problematic due to spatial constraints. The advertising spaces are often eliminated by special formatting, such as by palm-formatted pages and WAP-formatted pages.

What would be truly useful in a method for integrating advertising with the content being displayed to avoid conflicts between the ads and the available display area.

BRIEF SUMMARY OF THE INVENTION

The present invention is a system and method for integrating advertising with content more completely by hyperlinking certain keywords or phrases to another Web site (the "subsequent Web site"). The subsequent Web site is then charged for this service. For example, in an article discussing audio speakers, the word "subwoofer" in the middle of an article could be hyperlinked to a Web site that sells subwoofers, or provides more information about them. This hyperlink is sold to the Web site to which it is linked. In another embodiment, text displayed in any software application (not just browsers) is hyperlinked in the same manner.

To do this, the present invention comprises a system whereby words within content or dialogue are altered such that they are hyperlinked to an advertiser Web site. The advertiser Web site is charged for the service of being linked to in some way.

It is therefore an object of the present invention to avoid the limitations of online banner advertising occupying too much display space by fully integrating advertising links with content.

It is another object of the present invention to allow advertising to be delivered to any browser or other software application that supports HTTP, regardless of display size.

It is a further object of the present invention to provide a system and method for inserting hyperlinks to advertiser sites into the content of web pages.

It is a further object of the present invention to provide a system and method for inserting hyperlinks to advertiser sites into the text of any software application that supports HTTP.

It is yet another object of the present invention to provide a business model to compensate content providers providing anchor references for hyperlink ads and collect fees from the linked web pages containing the referred object of hyperlink ads.

These and other objectives of the present invention will become apparent to those skilled in the art from a review of the specification herein.

BRIEF DESCRIPTION OF THE DRAWINGS

FIG. 5 and FIG. 5A illustrate yet another embodiment of a process to practice the present invention when the content provider places code in HTML documents.

DETAILED DESCRIPTION OF THE INVENTION

The present invention in a method for taking content in text, HTML, or related format from Web pages (for browsers) or other sources (for other software applications that support HTTP) and searching it for words or phrases that advertisers have contracted to have hyperlinked to their Web pages. These words and phrases are then hyperlinked in HTML format to the advertiser's Web site, in a preferred embodiment involving routing through a tracking URL to track the number of times the hyperlink is clicked on. The content is then published on the Internet (for browsers) or displayed within an application (for other software applications that support HTTP) and readers seeing the content have the option of clicking on the hyperlink and visiting the contracted advertiser's Web site, as well as potentially holding their mouse or other pointing device over the hyperlink to see what site it leads to. The advertiser is then charged on a variety of different models including flat rate, flat rate by site, a rate for every time the hyperlinked word is viewed or called (an impression), every time the hyperlink is clicked on (clicks), or every time the hyperlink is clicked on and a sale, registration, or other action results (conversions). The content producer, distributor, or even the end viewer of the content, is potentially compensated on any of the same metrics as well.

Although "content," as used in reference to the Internet generally includes text, images, sounds, and software code transmitted to users, as used herein, the term "content" is more narrowly defined and refers to textually-based information, education, and entertainment materials (produced by organizations and individuals) that has been authored independent of any advertiser. The textual labels of images, including the ALT="image label" of IMG tags, are also considered to be included in the definition of content, as used herein.

The term "HTML," as used herein refers to any hypertext-capable markup language, including, but not limited to, DHTML, XHTML, SGML, XML, HDML, and WML.

Additionally, although the invention will now be described with respect to content from Web pages being hyperlinked and viewed in a browser, the invention is equally and similarly capable of being practiced with text from other sources being hyperlinked and viewed in any software application that supports HTTP. For example, an HTTP-enabled word processing application could have a macro or other code that performs hyperlinking on appropriate words in any document opened by the application.

Figure 1:
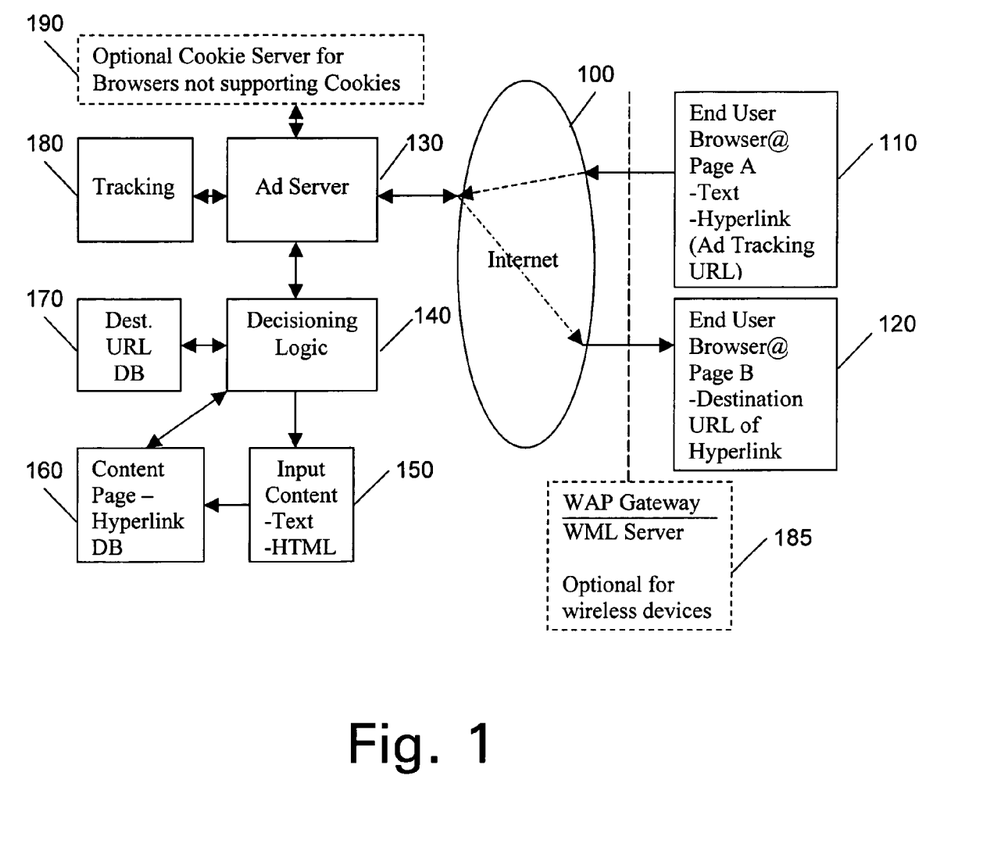
FIG. 1 illustrates a typical schematic for practicing on embodiment of the present invention.

As illustrated in FIG. 1, an end user browser 110 accesses Web page A over the Internet 100. The content of the page, in text, HTML, or related format, has earlier been input 150 into the system of the present invention and searched for words or phrases that advertisers have contracted to have hyperlinked to them. These words and phrases are then hyperlinked in HTML format to the advertisers Web page B 120 by routing through a tracking URL to track 180 the number of times the hyperlink is clicked on. The ad server 130 then looks up and supplies the destination URL from a Destination URL database 170 needed to hyperlink the browser to the correct advertiser Web page B 120. To accomplish this, the content published on page A includes the HTML with the desired words hyperlinked to a tracking URL. The end users browsing the content then has the option of clicking on the hyperlink and visiting the contracted advertisers Web site, as well as potentially holding their mouse over the hyperlink to see what site it leads to.

This hyperlinking of text is particularly useful for wireless devices that do not have displays appropriate for typical advertising media, but which do support hyperlinking. As shown in FIG. 1, an optional WAP gateway and WML server 185 can therefore be used to allow the invention to be practiced on wireless devices The advertiser is charged on a variety of different models including flat rate, flat rate by site, a rate for every time the hyperlinked word is viewed or called (an impression), every time the hyperlink is clicked on, or every time the hyperlink is clicked on and a sale, registration, or other action results although these methods are not meant as limitations in charging methods. The content producer, distributor, or even the end viewer of the content, could be compensated on any of the same metrics as well.

The ad server records tracking information concerning which hyperlink ads have been served to which pages for each ad served and includes the desired metric data such as date-time, actions (impressions, click-throughs, sales, etc.), media, page-position, person id, etc. required for any fee collection from advertisers or any revenue disbursement to Web pages displaying the hyperlink ads. To aid in tracking unique actions, an optional cookie server can be employed as a proxy for those browsers that do not support cookies or have them turned off.

Figure 2:
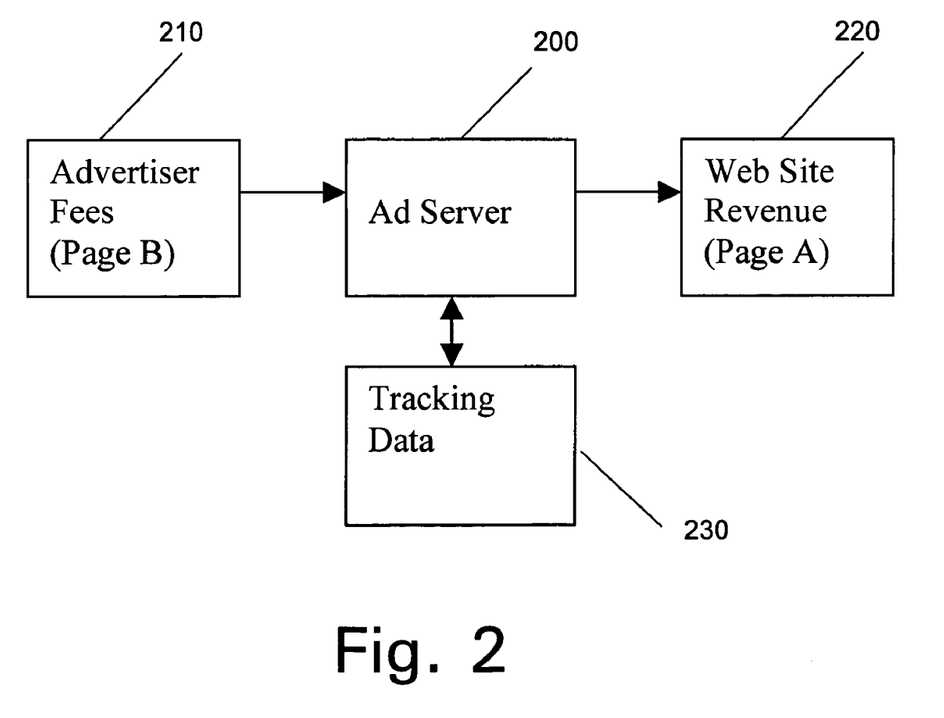
FIG. 2 illustrates a typical business model used by one embodiment the present invention.

As mentioned above and illustrated in FIG. 2, the tracking data 230 is then used by the ad server 200 to collect fees from advertisers 210 and distribute revenue to Web pages 220 on which the ads have been served (or other compensated party, such as, but not limited to, users or content providers).

Figure 3:
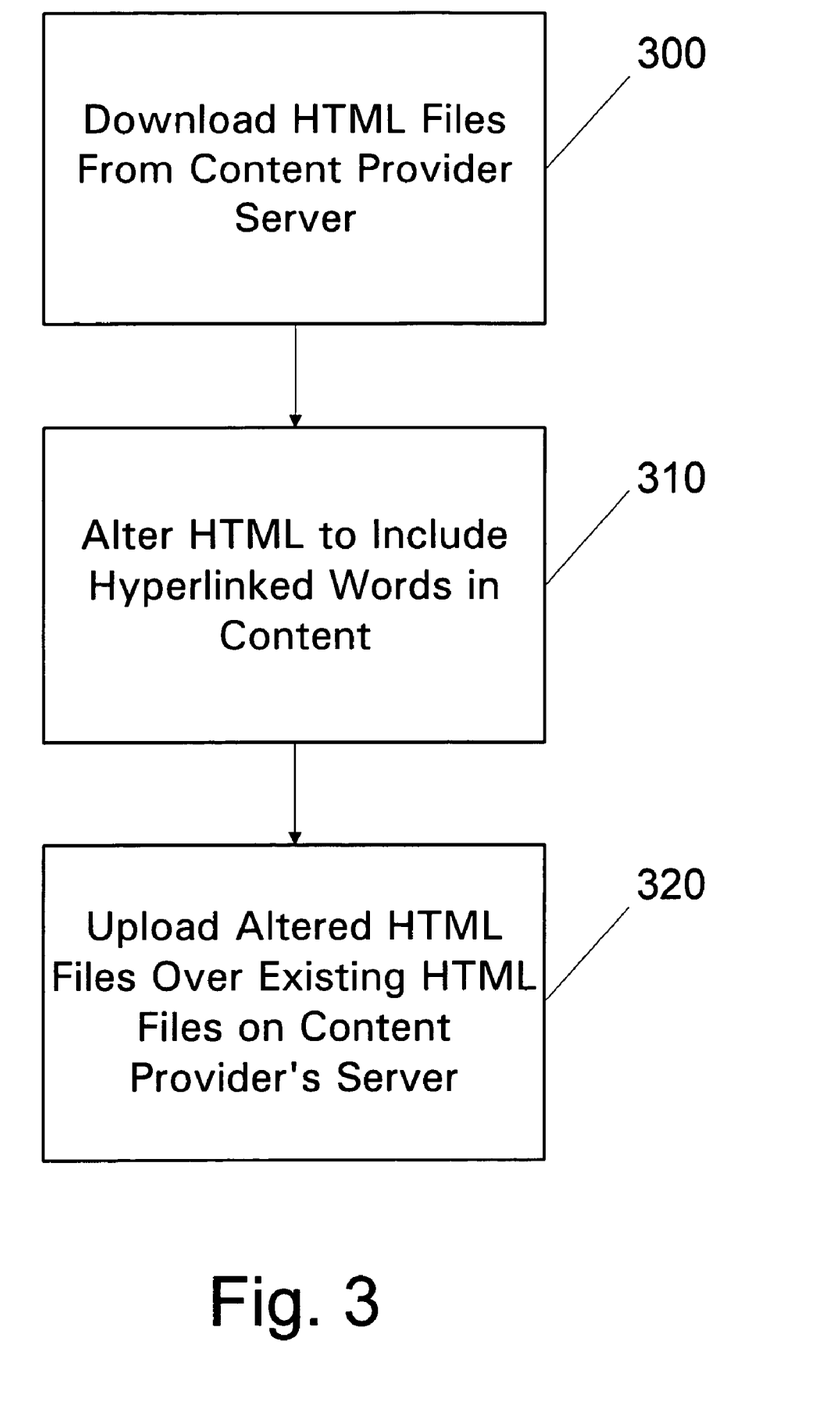
FIG. 3 illustrates a first embodiment of a process to practice the present invention. When the ad server downloads HTML files from the content provider.

The invention can be practiced in a variety of ways. In a first embodiment, illustrated in FIG. 3, the ad server downloads HTML files from the content provider 300. The ad server then alters the HTML to include hyperlinked words in the content 310. The ad server then uploads the altered HTML files over the existing HTML files on the content providers server 320.

Figure 4:
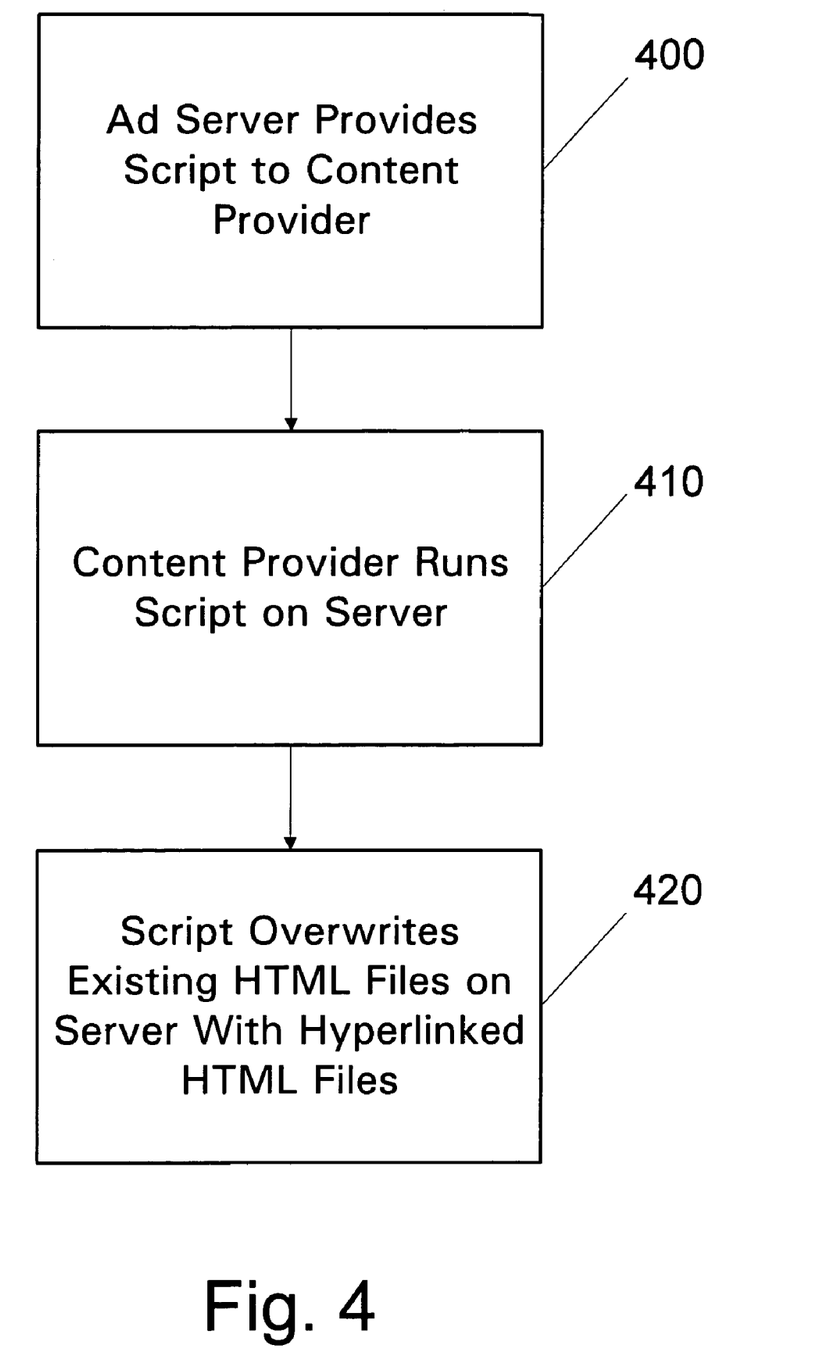
FIG. 4 illustrates another embodiment of a process to practice the present invention. Where the ad server provides a script to the content provider

In a second embodiment, illustrated in FIG. 4, the ad server provides a script to the content provider 400. The content provider then runs the script on their servers 410, and the script overwrites existing HTML files on the server with hyperlinked HTML files 420.

Figure 5:
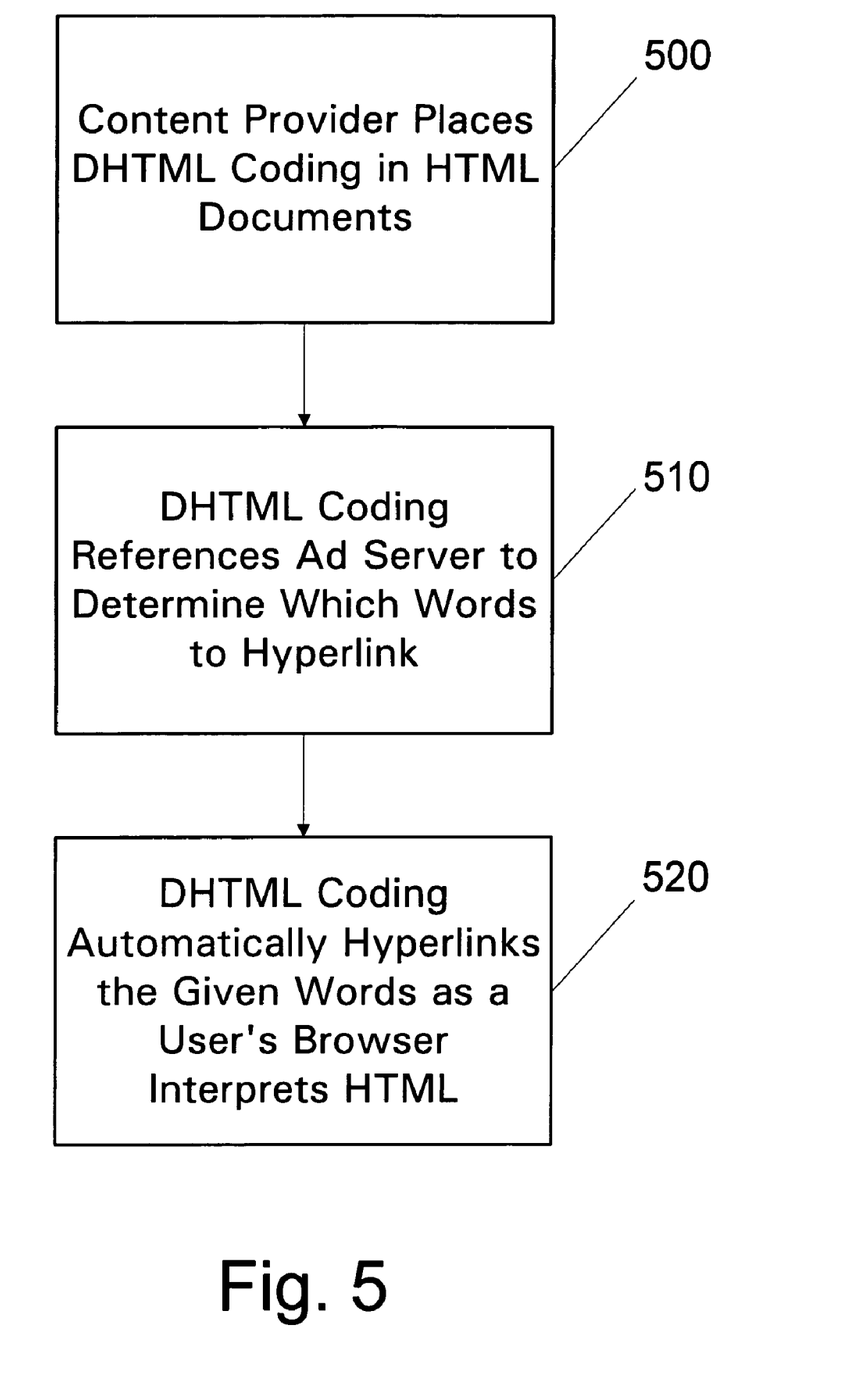

FIG. 5 illustrates another possible embodiment of the present invention. In this embodiment, the content provider places DHTML coding in their HTML documents 500. This DHTML coding then references the ad server in order to know which words to hyperlink 510. The DHTML coding then automatically hyperlinks the given words as a user's browser interprets the HTML 520.

Although described above with DHTML code, the present invention can also be practiced with a variety of other such coding, including, but not limited to, java, javascript, DHTL, or combinations thereof. The specific code is not a limitation, so long as it, by whatever means, will call the server and hyperlink certain words.

For example, in a typical embodiment of this version, the publisher ads a small tag to the bottom of each page on his web site, and we can then add the necessary hyper links to his page. The tag that the publisher would add to the bottom for the page would look something like this:

<SCRIPT LANGUAGE="JavaScript1.1"

src="http://ourserver.com/AdHyper.js?accountname"></SCRIPT>

This simply calls "ourserver" to find out which words to hyperlink where, and also passes through the publishers account name so we can keep track of how many impressions and clicks each publisher delivers.

The .js on "ourserver" would typically look something like this:

HyperLinker2000( );

```
function HyperLinker2000( ) {
   var txtRange=document.body.createTextRange( )
   var keyvalues=new Array('strike', 'investigation', 'the ', 'men ');
   var keylinks=new Array('<a href=http://www.espn.com> strike </a>', '<a href=http://www.NBA.com> investigation</a>', '<a href=http://www.washingtonpost.com the</a>', '<a href=http://www.washingtonpost.com> men</a>');
   for (var i=0; i<=500; i++) {
      var x=i;
      while(txtRange.findText(keyvalues[x])) {
      txtRange.pasteHTML(keylinks[x]);
      }
      var txtRange=document.body.createTextRange( )
```

}

}

The example above is displayed in FIG. 5A and is set to hyperlink the words "strike", "investigation", "the", and "men" to the corresponding URL. Notice the space before each word. This prevents from hyperlinking the piece of the word "men" from "Supermen", and only links the word men when it is preceded by a space.

Figure 6:
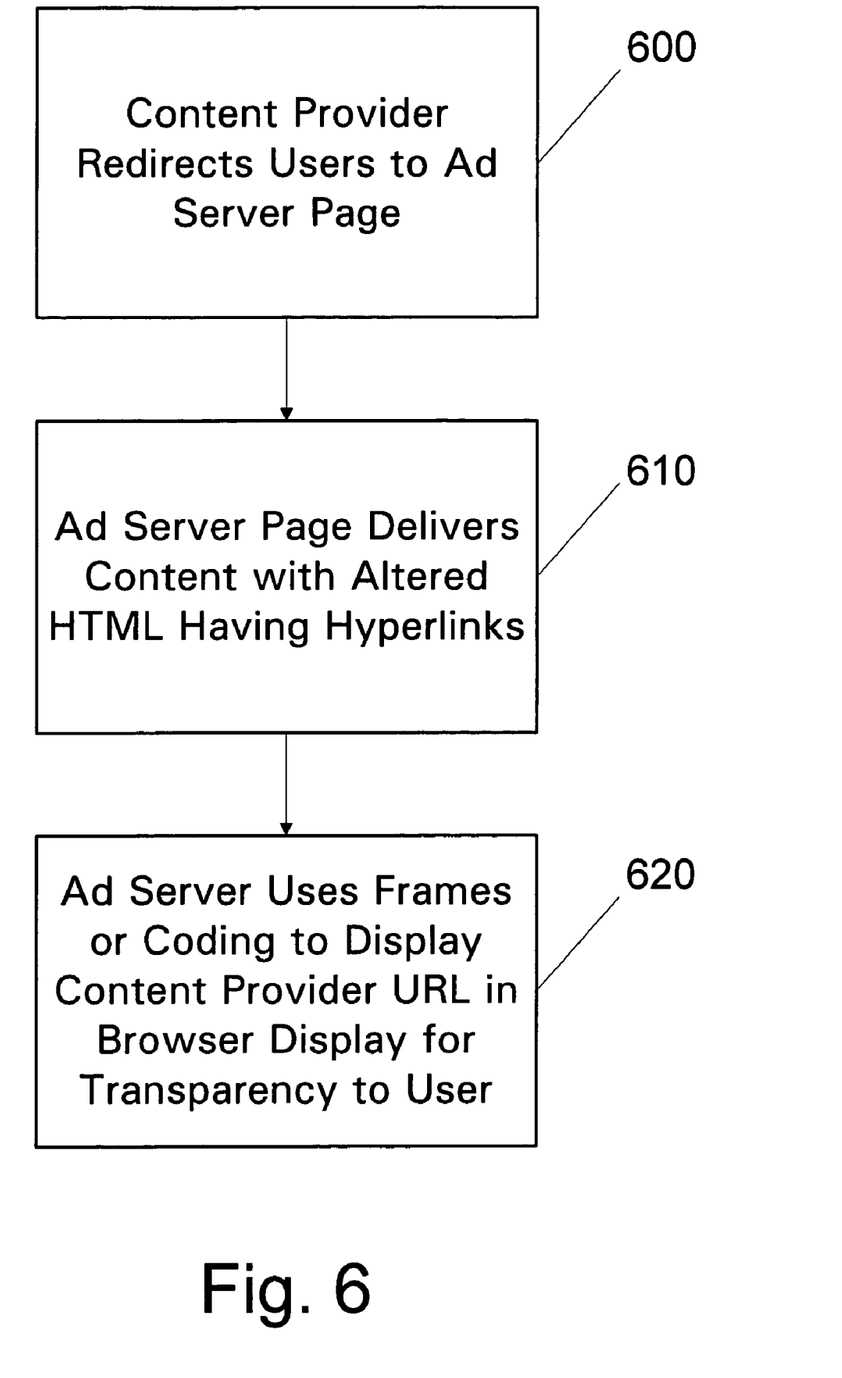
FIG. 6 illustrates an alternative embodiment of a process where web pages are served by the ad server to practice the present invention.

FIG. 6 illustrates an alternative embodiment wherein the web pages are served by the ad server. In this system the content provider redirects users to the ad server's web page 600. The ad server page delivers content with altered HTML that includes the hyperlinks 610. The ad server does this using frames or coding in order to display the content providers URL in the browser display 620. This function provides transparency to the user.

Figure 7A:
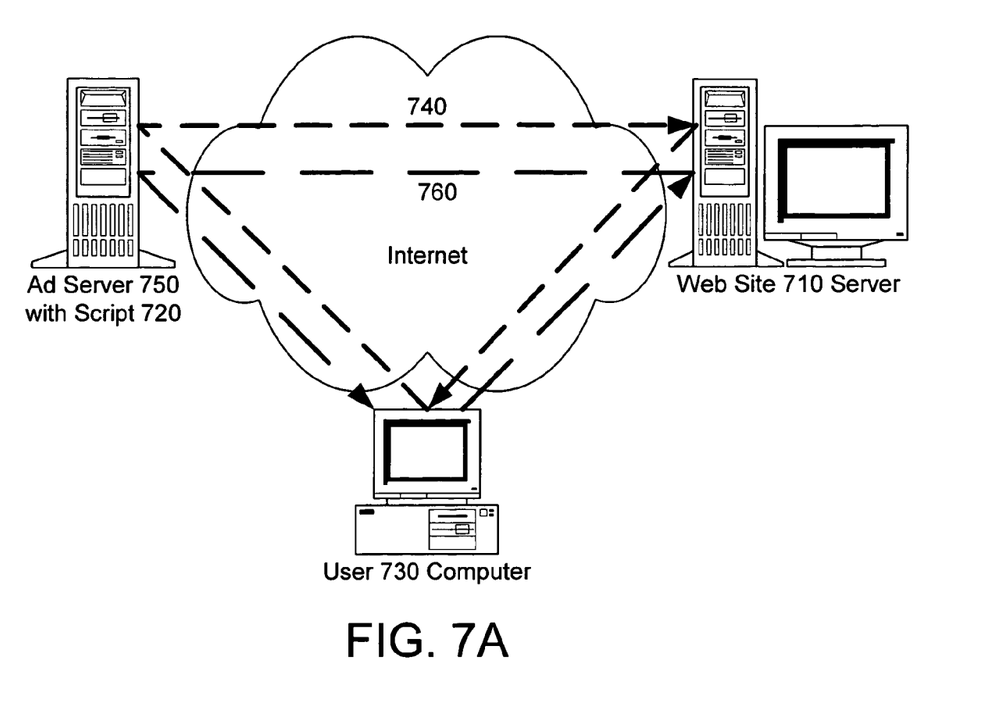
FIGS. 7A-B illustrate alternative embodiments of a process of the present invention where web pages are hyperlinked by software run on a user computer.
Figure 7B:
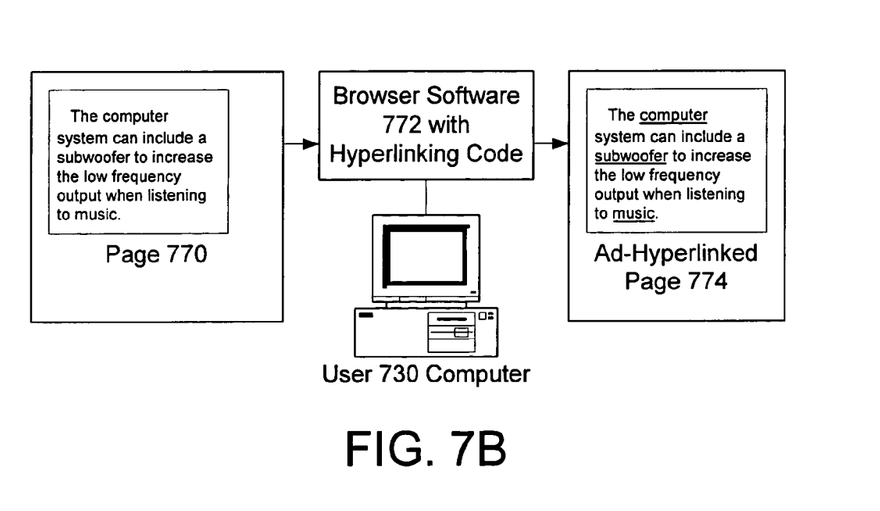

FIGS. 7A-B illustrate embodiments wherein the computer of the end viewer of the content (i.e., user) runs software that provides the text hyperlinks in the viewed content. This can be done in a variety of ways.

One way to accomplish this is to have the user's browser download a piece of software that interacts with the browser to either change the HTML to create the hyperlink or create a "layer" over the HTML that enables the ad server to hyperlink certain words, as illustrated in FIG. 7A. In this embodiment, the user is essentially accessing sites 710 through an ad server-supplied script 720, which performs the transformation when run on the computer of user 730. The viewed site 710 may or may not have knowledge of this. The action could be initiated by the user 730 (where the user chooses to come through the ad server, as shown by first arrow 740 to view pages or the ad server 750 provides some form of incentive) or initiated by the web site 710 (where the web site 710 chooses to route the user 730 through the ad server 750, as shown by second arrow 760).

In either situation, the user 730 is directed to a script 720 on the ad server 750 that analyzes and parses the requested page and changes the pages contents so they are displayed differently to the user 730 (the changes being hyperlinking certain words). A similar technology, used for entertainment, can be found at http://www.psyclops.com/translator/. Java, JavaScript, and Java applets could be used to perform either the method whereby the HTML is replaced as it is "read" by the end user with new HTML which contains the hyperlinks, or such that DHTML or language which uses a similar technology is inserted using Java, JavaScript, or a Java applet to create a "layer" that lays over the existing html and causes certain words to be hyperlinked.

Another way to have software perform the hyperlinking at the user's computer is to integrate the appropriate code that performs the hyperlinking of a page 770 into the browser software 772 displaying the text, as illustrated in FIG. 7B, to present an ad-hyperlinked page 774. In the illustration, "computer", "subwoofer", and "music" have been hyperlinked to advertiser-selected sites. To accomplish this type of hyperlinking, the ad server could partner with ICQ or Netscape and build into their software applications a component that performs the text hyperlinking. This could also be done by browser plug-ins.

Although all of the embodiments above have discussed hyperlinking to advertiser-selected sites, it is also possible that many advertisers will want to link to the same words. So, instead of linking directly to an advertisers web site, the ad server could instead link the word or phrase to a list of advertisers related to (or who have selected) the word or phrase in a new HTML page or new document, or via a DHTML layer containing this list (the DHTML version could be by click, or by simply moving a selector (i.e., a "mouseover") showing the list when the user holds their mouse or pointing device over the hyperlink). This new list could open as a new HTML page in the original browser window, or in a new browser window, typically somewhat similar then the original. This list could take the format of what are typically described as search engine listings, the advertisers typically being charged for appearing in these listings, either CPM, CPC, or CPA or combination thereof, and possibly ranked in order of payment (so the advertiser paying the most would get listed highest on the list).

The ad serving system typically can include load balancers, such as Cisco/Arrowpoint CS 800's performing layer 7 polling with HTTP "get" calls every 1-3 seconds, to evenly distribute the requests to the ad servers. The ad servers will typically consist of 32-36 Pentium III processors running at 600-800 MHz, each having 1-2 GB of RAM and 36 GB hard drives. Server software can be C++ compiled and running on FreeBSD, being held together with Chron, Perl, and Perlscripts, and could also be ported to Linux, A/UX, Windows NT, and Sun Solaris.

Typical cookie server hardware can include multi-processor systems with raid arrays and 4 GB of RAM, running on Linux or FreeBSD and communicating with the ad server via TCP.

The database hardware can typically include a pair of Sun 4500 processors and an EMC raid array with MySQL database management software. Destination URLs can be served from the destination (ad) database via NFS mount to the ad server.

We claim:

1. An apparatus for hyperlinking specific words in content to convert the words into advertisements, comprising:
   an Internet-enabled web browsing device, including a terminal for connection to the Internet;
   a content provider server having content files to be displayed on web browsers, said content provider server being connected to the Internet;
   an advertiser web page accessible over the Internet; and
   an ad server connected to the Internet, wherein code in one of said content files references said ad server to determine at least one existing advertiser-chosen human-language word present in said content file, said content file being interpreted by a web browser and said code automatically, as said content file is interpreted by said web browser, providing a hypertext anchor for said at least one existing advertiser-chosen human-language word, thereby converting said at least one existing advertiser-chosen human-language word into an advertisement by linking said at least one advertiser-chosen human-language word to said advertiser web page.

2. The apparatus of claim 1, further including a means associated with said ad server to determine said at least one existing advertiser-chosen human-language word present in said content file to hyperlink when referenced by said code in said content file.

3. The apparatus of claim 2, wherein said means associated with said ad server comprises:
   decisioning logic; and
   a database associating said at least one existing advertiser-chosen human-language word with a destination URL pointing to said advertiser web page.

4. The apparatus of claim 1, further comprising means to link to said advertiser web page using a tracking URL.

5. A method for hyperlinking specific words in content to convert the words into advertisements, comprising:

connecting a content provider server to the Internet, said content provider server having content files to be displayed via web browsers;

providing an advertiser web page so as to be accessible over the Internet;

connecting an ad server to the Internet;

referencing, by code in one of said content files, said ad server to determine at least one existing advertiser-chosen human-language word present in said content file; and interpreting, by a web browser, said content file and said code automatically, as said content file is interpreted by said web browser, providing a hypertext anchor for said at least one existing advertiser-chosen human-language word, thereby converting said at least one existing advertiser-chosen human-language word into an advertisement by linking said at least one advertiser-chosen human-language word to said advertiser web page.

6. The method of claim 5, wherein the ad server provides a hypertext anchor to an advertiser-chosen human-language word in said content file by determining which human-language words a means associated with said ad server determines said at least one existing advertiser-chosen human-language word present in said content file to hyperlink when referenced by said code in said content file.

7. The method of claim 5, wherein said ad server employs frames so as to display a content provider URL in a browser window of an Internet-enabled web browsing device.

8. The method of claim 5, wherein said ad server employs coding to display a content provider URL in a browser window of an Internet-enabled web browsing device.

9. The method of claim 5, further comprising linking to said advertiser web page using a tracking URL.

10. A method for advertising by hyperlinking specific words in content to convert the words into advertisements, comprising:

referencing, by code in said content, an ad server to determine at least one existing advertiser-chosen human-language word present in said content;

interpreting said content file by a web browser;

said code automatically, as said content file is interpreted by said web browser, providing a hypertext anchor for said at least one existing advertiser-chosen human-language word, thereby converting said at least one existing advertiser-chosen human-language word into an advertisement by linking said at least one advertiser-chosen human-language word to an advertiser web page; and receiving compensation from said advertiser.

11. The method of claim 10, further comprising compensating at least one of a provider of said content of said Internet-displayed file and an entity that selects said hypertext anchor.

12. The method of claim 11, further comprising compensating on a basis selected from the group consisting of flat rate per ad, flat rate per site, impressions, clicks, and conversions.

13. The method of claim 10, further comprising linking to said advertiser web page using a tracking URL.

14. An apparatus for hyperlinking specific words displayed in an application to convert the words into advertisements, comprising:

an Internet-enabled device, including a terminal for connection to the Internet;

an HTTP-enabled software application operating on said device;

a source for text-containing files to be viewed in said software application;

an advertiser file accessible over the Internet; and an ad server connected to the Internet, wherein code in one of said text-containing files references said ad server to determine at least one existing advertiser-chosen human-language word present in said text-containing file, said text-containing file being interpreted by a web browser and said code automatically, as said text-containing file is interpreted by said web browser, providing a hypertext anchor for said at least one existing advertiser chosen human-language word, thereby converting said at least one existing advertiser-chosen human-language word into an advertisement by linking said at least one advertiser-chosen human-language word to said advertiser file.

15. The apparatus of claim 14, further comprising means to link to said advertiser file using a tracking URL.

16. A method for hyperlinking specific words in text-containing files to convert the words into advertisements, comprising:

providing an Internet-enabled device with an HTTP-enabled software application;

providing said text-containing file to be viewed by said software application;

providing an advertiser file so as to be accessible over the Internet;

connecting an ad server to the Internet;

referencing, by code in said text-containing file, said ad server to determine at least one existing advertiser-chosen human-language word present in said text-containing file;

interpreting said text-containing file by a web browser; and said code automatically, as said text-containing file is interpreted by said web browser, providing a hypertext anchor for said at least one existing advertiser-chosen human-language word, thereby converting said at least one existing advertiser-chosen human-language word into an advertisement by linking said at least one advertiser-chosen human-language word to said advertiser file.

17. The method of claim 16, further comprising linking to said advertiser file using a tracking URL.

18. A method for advertising by hyperlinking specific words in documents to convert the words into advertisements, comprising:

viewing a document with a software application;

referencing, by code in said document, an ad server to determine at least one existing advertiser-chosen human-language word present in said document;

interpreting said document by a web browser;

said code automatically, as said document is interpreted by said web browser, providing a hypertext anchor for said at least one existing advertiser-chosen human-language word, thereby converting said at least one existing advertiser-chosen human-language word into an advertisement by linking said at least one advertiser-chosen human-language word to an advertiser web page; and receiving compensation from said advertiser.

19. The method of claim 18, further comprising compensating an entity that selects said hypertext anchor.

20. The method of claim 19, further comprising compensating on a basis selected from the group consisting of flat rate per ad, flat rate per software application, impressions, clicks, and conversions.

21. The method of claim 18, further comprising linking to said advertiser document using a tracking URL.

22. A method of advertising by hyperlinking a specific word in content to convert the word into an advertisement, comprising:

referencing, by code in the content, an ad server to determine at least one existing advertiser-chosen human-language word present in the content;

interpreting the content by a web browser;

providing, automatically by the code as the content is interpreted by the web browser, a hypertext anchor for the at least one existing advertiser-chosen human-language word, thereby converting the advertiser-chosen human-language word into a hyperlink that links the advertiser-chosen human-language word to an advertiser web page; and positioning a mouse pointer over the hyperlink, the positioning causing a description of the advertiser web page to be displayed.

23. The method of claim 22, further comprising charging the advertiser a fee when the hyperlink is clicked.

24. A method for hyperlinking specific words in content to convert the words into advertisements, comprising:

referencing, by code in a content file being interpreted by a web browser for display on a user device, an ad server;

receiving, by the user device, a determination of at least one existing advertiser-chosen human-language word present in the content file;

interpreting the content file by a web browser; and providing, automatically by the code as the content file is interpreted by the web browser, a hypertext anchor for the at least one existing advertiser-chosen human-language word automatically, when the content file is interpreted by the web browser, thereby converting the at least one existing advertiser-chosen human-language word into an advertisement by linking the at least one advertiser-chosen human-language word to an advertiser web page.

25. A method for converting specific words in content into advertisements, comprising:

transmitting a content file from a content provider to a user device, the content file being interpreted by a web browser executed by the user device, wherein the content file comprises code, the code for:

referencing an ad server to determine at least one existing advertiser-chosen human-language word that is present in the content file; and providing a hypertext anchor for the at least one existing advertiser-chosen human-language word automatically, as the content file is interpreted by the web browser, thereby converting the at least one existing advertiser-chosen human-language word into an advertisement by linking the at least one advertiser-chosen human-language word to an advertiser web page.

* * * * *

UNITED STATES PATENT AND TRADEMARK OFFICE
CERTIFICATE OF CORRECTION

PATENT NO. : 7,617,121 B1 Page 1 of 1
APPLICATION NO. : 09/711261
DATED : November 10, 2009
INVENTOR(S) : Demayo et al.

It is certified that error appears in the above-identified patent and that said Letters Patent is hereby corrected as shown below:

Title page, item (*) Notice:   should read as follows:   nSubject to any disclaimer, the term of this patent is extended or adjusted under 35 U.S.C. 154(b) by 1545 days.

Signed and Sealed this

Tenth Day of August, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,617,121 B1 | Page 1 of 1 |
| APPLICATION NO. | : 09/711261 | |
| DATED | : November 10, 2009 | |
| INVENTOR(S) | : Demayo et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1577 days.

This certificate supersedes the Certificate of Correction issued August 10, 2010.

Signed and Sealed this
Fifteenth Day of March, 2011

David J. Kappos
*Director of the United States Patent and Trademark Office*